June 9, 1959 E. H. BROWN ET AL 2,890,123
APPARATUS AND METHOD OF PRESERVING FOODSTUFFS AND THE LIKE
Filed Sept. 30, 1955
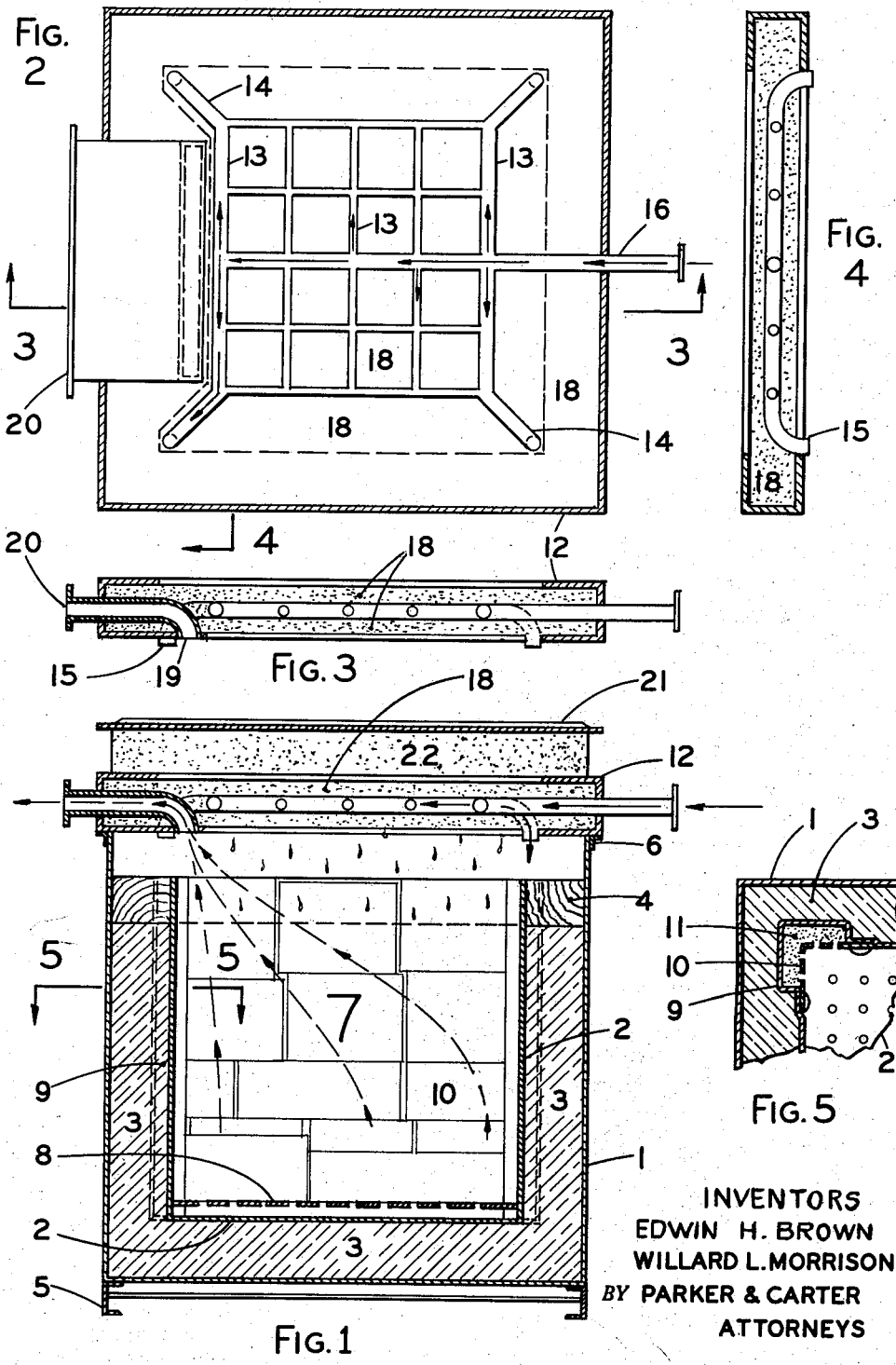
INVENTORS
EDWIN H. BROWN
WILLARD L. MORRISON
BY PARKER & CARTER
ATTORNEYS

United States Patent Office 2,890,123
Patented June 9, 1959

2,890,123

APPARATUS AND METHOD OF PRESERVING FOODSTUFFS AND THE LIKE

Edwin H. Brown, Elm Grove, Wis., and Willard L. Morrison, Lake Forest, Ill.; said Morrison assignor to The Union Stock Yard and Transit Company of Chicago, Chicago, Ill., a corporation of Illinois Application September 30, 1955, Serial No. 537,732

9 Claims. (Cl. 99—192)

Our invention relates to improvements in an apparatus and method of preserving foodstuffs and the like at low temperatures. One object is to provide an apparatus whereby cold boiling liquids such, for example, as liquid nitrogen may be used at substantially atmospheric pressure to chill the material.

Another object is to provide a method and apparatus whereby the cold boiling liquid may be rapidly introduced to the entire mass to be chilled, thereby producing rapid chilling. By cold boiling liquids, we mean a liquid, which at atmospheric pressure boils at temperatures far below freezing, even far below zero degrees F. and while nitrogen is a suitable cold boiling liquid for our purposes, any cold boiling liquid which does not deleteriously affect foodstuffs when brought in contact with them, may be used.

We propose, for example, to pack frozen foodstuffs in an insulated container which if of proper size and shape may be used as a portable shipper container; to then discharge into the container at atmospheric pressure a cold boiling liquid. The material in the container being at a temperature far above the boiling point of the liquid will first give up its heat to the liquid, causing it to boil and evaporate and thereafter give up its heat to the resultant gas raising the temperature thereof.

If desired, the material to be chilled by the liquid nitrogen may be packed in an unfrozen condition though ordinarily it is preferable to pack frozen foodstuffs at normal temperatures in the order of zero degrees F. In either case, after the process is completed, there results an insulated container filled with the foodstuffs or other materials being preserved at temperatures far below zero in an atmosphere to which the foodstuffs may be safely exposed.

The container may thereafter be closed for shipment or storage. If nitrogen, for example, is used much if not all of the air will ultimately be expelled from the shipper container and will be replaced by nitrogen with little if any oxygen. Under some circumstances, it is desirable to expose the foodstuffs to an atmosphere of minimum oxygen content.

Other objects will appear from time to time in the course of the specification and claims.

Our invention is illustrated more or less diagrammatically in the accompanying drawings, wherein—

Figure 1 is a vertical section through a container with the liquid distribution manifold in position;

Figure 2 is a plan view of the liquid distribution manifold with parts in section;

Figure 3 is a section along the line 3—3 of Figure 2;

Figure 4 is a section along the line 4—4 of Figure 2 with parts in elevation;

Figure 5 is a section along the line 5—5 of Figure 1.

Like parts are indicated by like characters throughout the specification and drawings.

1 are the outer walls, 2 the inner walls of an insulated shipper container. A mass of insulation 3 is enclosed between the walls. The walls 1 extend upwardly above the inner walls and the upper boundary of the insulation is co-extensive with the upper boundary of the inner walls.

The insulation is adequate to hold the inner and outer walls in proper relationship but if desired, additional means, not here illustrated as they form no part of the present invention, may be used. If granular or other types of insulation not having structural strength are used, the insulation will be held in position by a filler body or blocks 4 of wood or other suitable structurally self-supporting insulation, the upper boundary of which is in the same horizontal plane as the upper edge of the inner wall so that there is no easy path for heat flow from inner to outer wall of the shipper container. Reinforcing skids 5 may be provided to support the shipper container, if desired, and the outer wall may be reinforced by an outwardly extending flange 6. The food stuffs indicated at 7 to be chilled or frozen will be packed in the container to a level not above the upper boundary of the reinforcing member 4.

8 is a foraminous floor at the bottom of the shipper container spaced above the bottom of the inner wall or lining to permit space for liquid flow. Disposed within the vertical portion of the inner wall 2 are a plurality of channels or ducts 9. For convenience, they are illustrated as being at the corners of the rectangular shipper container though they might be placed anywhere within the side wall. These channels are closed generally in alignment with the wall by foraminous partitions 10 and under some circumstances the channel will be filled with a soaking pad 11, protected by the foraminous wall 10. These channels communicate with the space between the foraminous floor 8 and the bottom of the shipper container.

12 is a rectangular liquid distribution manifold frame. It is open at top and bottom as indicated and conforms generally to the contour of the shipper container, resting upon the upper edges of the outer wall 1. This frame contains as indicated in Figure 2 a grid work of liquid distribution pipes 13 intersecting one with the other in a grid shown as being rectangular but other contour might equally well be used. The distance between the outermost tubes of the grids is slightly less than the associated distance across the container and extending outwardly from the grid are radial passages 14 which terminate in downwardly discharging nozzles 15 in register with the channels 9. A feed pipe 16 extends inwardly through the wall of the frame 12 so that cold boiling liquid may be supplied to the entire grid. The pipes making up the grid are foraminous, that is, they may be made of rolled wire screening or the pipe wall may be perforated as the case may be and this grid is embedded in an absorptive soaking pad 18 which completely fills the frame 12. When cold boiling liquid is discharged through the pipe 16 to the grid 13 that cold boiling liquid saturates the absorptive pad, drips down onto the material stored in the container. Some of the cold boiling liquid which does not pass through the walls of the grid will be discharged through the duct 14 to the channels 9 and thence into the space below the foodstuffs. Thus the top, bottom and sides of the body of foodstuffs may all be brought into contact with the liquid and then into contact with the gas so as to give up heat first to vaporize the liquid and then to raise the temperature of the gas.

The gas vaporized from the liquid will pass out through the port 19, duct 20, for discharge outside of the container. 21 is a cover for the shiper container. Preferably this cover takes the form of a relatively light metal sheet which overlies the flanges 6 and may be fastened thereto by any suitable means when the container is closed and which overlies the liquid distribution manifold frame while the cold boiling liquid is being introduced.

The clearance space between the cover and the level of the liquid will after the contents of the shipper container has been chilled to the desired point be filled by a removable flexible insulating blanket 22 which will be of sufficient thickness to extend from the level of the goods or material in the shipper container up to the cover 21 and across the entire space between the outer walls 1, lying on the insulating member 4. This blanket may be rolled up for storage and may be inserted after the distribution manifold has been removed if desired or it may be in place before the liquid is supplied. In the latter case the blanket will be saturated by the liquid dripping down from the manifold frame and after evaporation the blanket will serve as insulation alone but prior to evaporation will participate in the cooling action by transmitting liquid for contact with the material to be frozen in the container.

As the liquid nitrogen is poured into the manifold, it is distributed as liquid over the top of the contents of the container and as liquid passes down around the sides of the mass in the container to penetrate below the material in the container, the contents of the container will be exposed to and lose heat to vaporize the cold boiling liquid so that heat is extracted from the contents of the container at top, bottom and sides. The vertical soaker pads may extend throughout the entire side area or might be disposed along different portions of the area, so long as they bring a sufficient amount of the liquid into contact with the contents to insure a rapid, generally uniform chilling effect.

As the chilling proceeds, it may well happen that because of the great temperature differences between the contents of the liquid and the container in the initial stages, the liquid may be vaporized before it entirely penetrates the storage area but as the process goes on the liquid will penetrate further and further into the storage area so that before the process is completed, it will usually occur that the cold boiling liquid will be in contact with top, bottom and sides of the load in the container.

As the liquid evaporates it increases greatly in volume and the cold gas escaping through duct 20, may be discharged into the atmosphere, or for other use as desired because that gas will, even though it has been warmed by the contents of the container, be at an exceedingly low temperature.

Figure 1 shows the insulating pad 22 above the distribution manifold to limit entrance of heat to the upper side of the manifold. Under these circumstances, the pad 22 will be dry when it is placed in the container.

While we have suggested the use of nitrogen as the cold boiling liquid, it will be obvious that any cold boiling liquid, the boiling temperature of which at atmospheric pressure is below the temperature to which it is desired to chill the material, is suitable as the coolant.

We claim:

1. Means for chilling foodstuffs including a liquid tight container open at the top, adapted to contain the foodstuffs, an absorptive pad, generally co-extensive with the open top of the container, a grid of foraminous tubing embedded and generally co-extensive with the pad, an absorptive pad extending downwardly toward the bottom of the container, and means for supplying cold boiling liquid to the grid and to the pad extending downwardly therefrom.

2. The method of chilling foodstuffs previously frozen to a temperature in the order of zero degrees F., enclosed in a liquid tight zone, which consists in saturating, with a cold boiling liquid to the extent of causing the liquid to drip therefrom, an absorptive zone distributing the liquid as it drips, generally uniformly over the upper surface of the foodstuffs and continuing such saturation until a quantity of the cold boiling liquid sufficient to chill the foodstuffs to the desired low temperature has been supplied to the absorptive zone and removing the zone containing the chilled material.

3. The method of chilling foodstuffs previously frozen to a temperature in the order of zero degrees F., enclosed in a liquid tight zone, which consists in saturating, with a cold boiling liquid to the extent of causing the liquid to drip therefrom, an absorptive zone distributing the liquid as it drips, generally uniformly over the upper surface of the foodstuffs, causing some of the liquid to pass downwardly through the liquid tight zone toward the bottom of the mass of foodstuffs and continuing such saturation until a quantity of the cold boiling liquid sufficient to chill the foodstuffs to the desired low temperature has been supplied to the absorptive zone and removing the zone containing the chilled material.

4. The method of chilling foodstuffs previously frozen to a temperature in the order of zero degrees F., enclosed in a liquid tight zone, insulated against heat flow, which consists in, conducting cold boiling liquid at temperature far below zero degrees F. and at substantially atmospheric pressure to the zone in contact with the top, bottom and sides of the mass of material, discharging the resultant gas at substantially atmospheric pressure from the upper portion of the zone and when chilling is complete, closing the zone while it contains an atmosphere consisting primarily of the gas vaporized from the cold boiling liquid and removing the zone containing the chilled material.

5. Means for chilling foodstuffs including an insulated container open at the top only, a removable distribution manifold closing the open top, and a removable cover for the container adapted to rest upon and mask the upper face of the manifold, the manifold including a foraminous tubular grid generally coextensive with the manifold and an absorptive pad enclosing and in contact with the grid.

6. Means for chilling foodstuffs including an insulated container open at the top only, a removable distribution manifold closing the open top, and a removable cover for the container adapted to rest upon and mask the upper face of the manifold, the manifold including a foraminous tubular grid generally coextensive with the manifold and an absorptive pad enclosing and in contact with the grid, an absorptive pad extending downwardly toward the bottom of the container adapted to receive liquid from the manifold.

7. Means for chilling fodstuffs including an insulated container open at the top only, a removable distribution manifold closing the open top, and a removable cover for the container adapted to rest upon and mask the upper face of the manifold, the manifold including a foraminous tubular grid generally coextensive with the manifold and an absorptive pad enclosing and in contact with the grid, an absorptive pad extending downwardly toward the bottom of the container adapted to receive liquid from the manifold, a reinforcing foraminous armor masking the downwardly extending absorptive pad.

8. A distribution manifold comprising a frame, a grid of foraminous tubing carried thereby, a supply duct extending inwardly through the frame connected to and adapted to discharge into the foraminous grid, an absorptive pad in the frame and enclosing and in direct contact with the foramious grid, a discharge duct carried by the frame extending through the pad having an exhaust port open on the underside of the frame.

9. In combination, an insulated container open at the top only, a foraminous floor spaced above the bottom of the container, defining therewith a liquid chamber, an absorptive pad extending downwardly from the top of the container toward and in communication with the liquid containing chamber, a foraminous armor for said absorptive pad, an absorptive pad closing the top of the container and means for supplying liquid to the absorptive pad at the top and thence through the downwardly extending absorptive pad to the liquid containing chamber.

References Cited in the file of this patent

UNITED STATES PATENTS

| | | |
|---|---|---|
| 2,447,249 | Hill | Aug. 17, 1948 |
| 2,555,502 | Morrison | June 5, 1951 |
| 2,618,939 | Morrison | Nov. 25, 1952 |
| 2,655,856 | Hart | Oct. 20, 1953 |

FOREIGN PATENTS

| | | |
|---|---|---|
| 521,715 | Great Britain | May 29, 1940 |

OTHER REFERENCES

"Quick Freezing of Foods in Liquid Nitrous Oxide," I. G. Farben at Hobhst, pages 1 and 8.